United States Patent [19]
Edmark, III

[11] Patent Number: 5,187,979
[45] Date of Patent: Feb. 23, 1993

[54] MULTI-SENSOR PROBE ASSEMBLY AND METHOD FOR FUEL STORAGE SYSTEM INCLUDING OVERFLOW PROTECTION MEANS

[76] Inventor: Karl W. Edmark, III, 8502 E. Cavecreek Rd., Unit #2, Carefree, Ariz. 85377

[21] Appl. No.: 692,295

[22] Filed: Apr. 26, 1991

[51] Int. Cl.$^5$ ............................................. G01F 23/26
[52] U.S. Cl. ................................. 73/304 C; 73/291; 141/115; 324/690
[58] Field of Search ............... 73/304 C, 242, 290 R, 73/291; 361/284; 324/690

[56] References Cited

U.S. PATENT DOCUMENTS

| | | | |
|---|---|---|---|
| 3,010,319 | 11/1961 | Sontheimer | 73/304 C |
| 3,114,262 | 12/1963 | Atun | 73/304 C |
| 3,477,290 | 11/1969 | Lerner | 73/304 C |
| 3,533,286 | 10/1970 | Westcott et al. | 73/304 C |
| 3,695,108 | 10/1972 | Wygant | 73/292 X |
| 3,797,535 | 3/1974 | Kaiser | 141/115 X |
| 4,245,188 | 1/1981 | Rottmar | 73/304 C X |
| 4,399,699 | 8/1983 | Fujishiro | 73/304 C |
| 4,418,571 | 12/1983 | Asmundsson et al. | 73/304 C |
| 4,449,405 | 5/1984 | Franz | 73/304 C |
| 4,457,170 | 7/1984 | Thrift et al. | 361/284 X |
| 4,915,145 | 4/1990 | Schirmacher | 73/290 R |

Primary Examiner—Daniel M. Yasich
Attorney, Agent, or Firm—Harry M. Weiss

[57] ABSTRACT

A probe assembly and method is disclosed which includes a plurality of sensors for respectively mreasuring predetermined attributes of a fluid. The probe assembly comprises a first sensor for measuring the quantity of the fluid. The first sensor includes a capacitive reference cell and a capacitive product measurement cell, each of the cells being characterized by respective associated capacitances. In particular, the capacitance associated with the capacitive product measurement cell varies in accordance with the quantity of the fluid so that the quantity of the fluid is indicated by the quantitative relationship between the magnitude of the capacitance associated with the capacitive reference cell and the magnitude of the capacitance associated with the capacitive product measurement cell. A second sensor extends coaxially at an extremity of the reference cell and includes a conductive portion to be at least partially immersed in the fluid so that the conductive portion of the second sensor is operable to effectively form a capacitive element with the fluid and with an extraneous conductive element. In this manner the capacitance of the capacitive element is determined by the characteristics of the fluid. A third sensor in the form of a thermistor is disposed in the reference cell for determining the temperature of the fluid. A liquid overflow detection device and method is also disclosed.

45 Claims, 4 Drawing Sheets

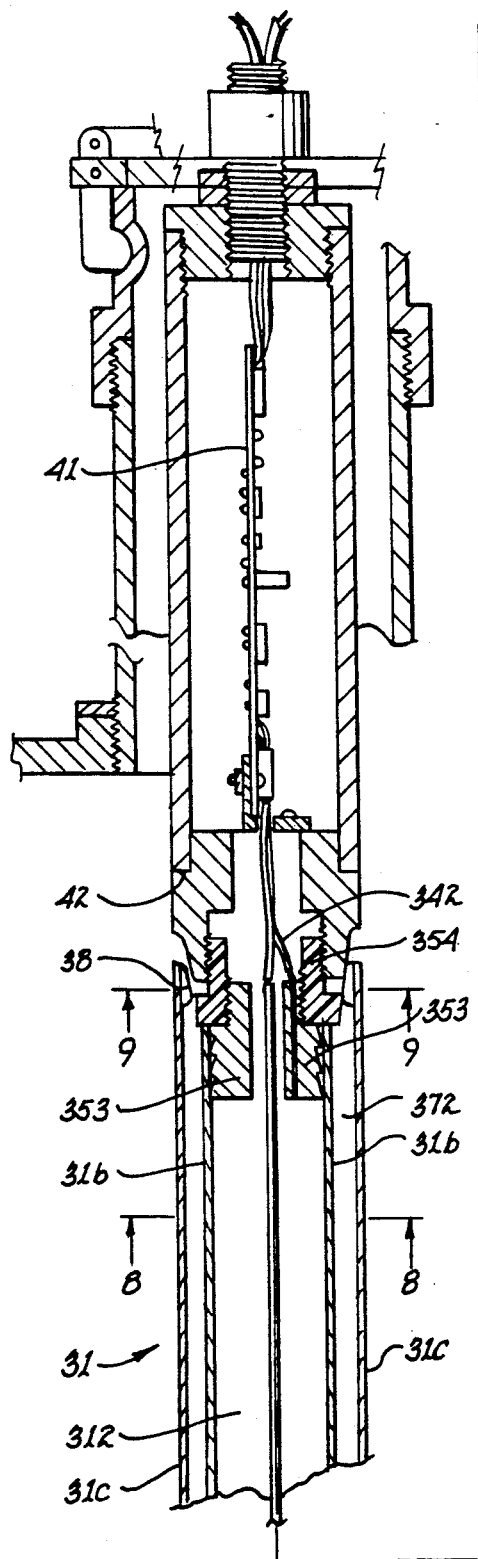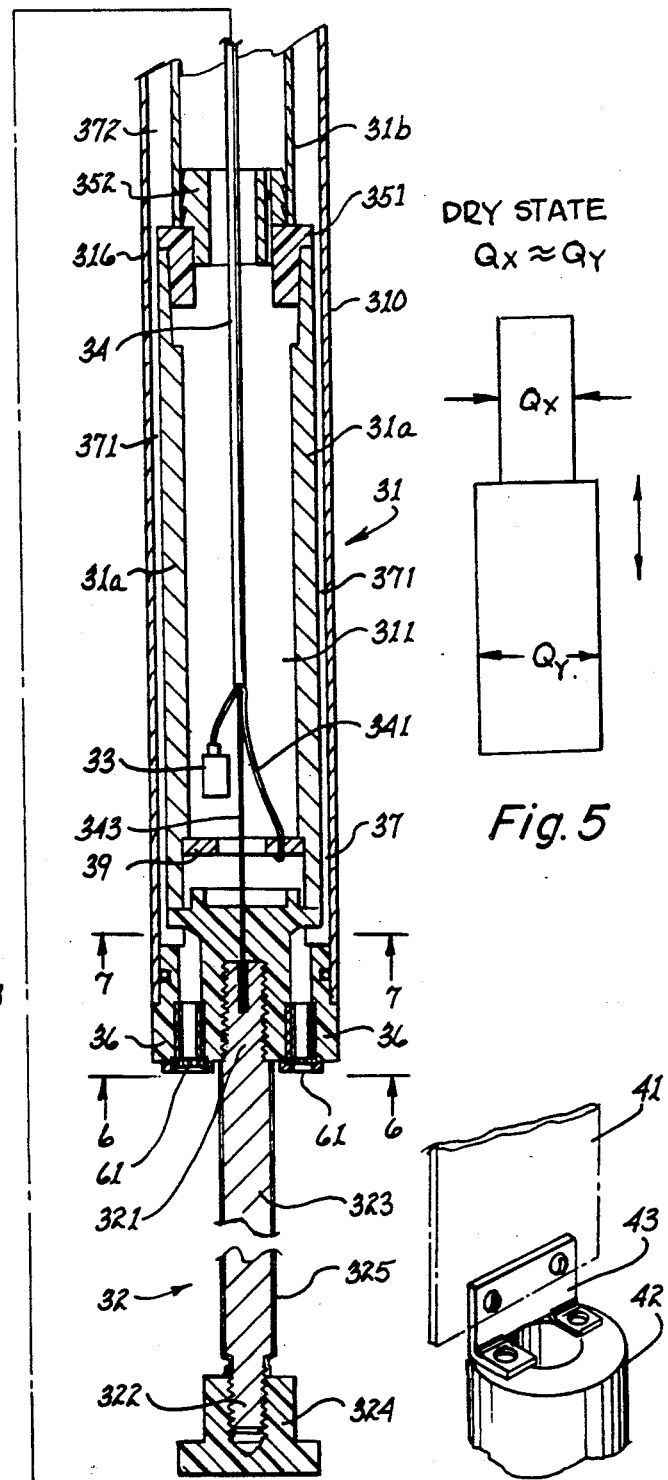

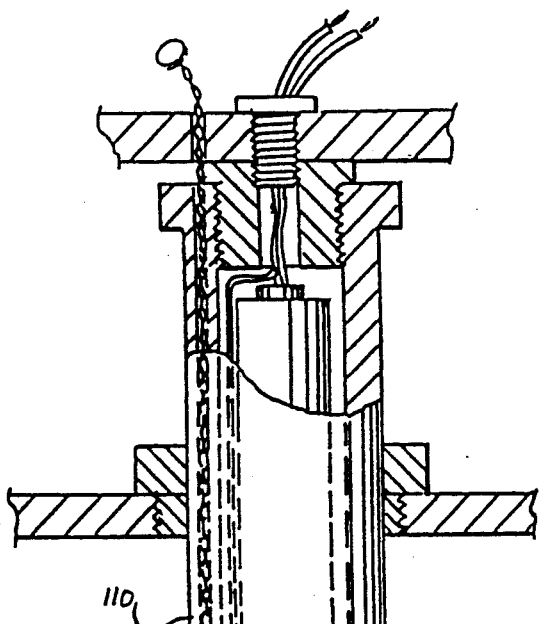
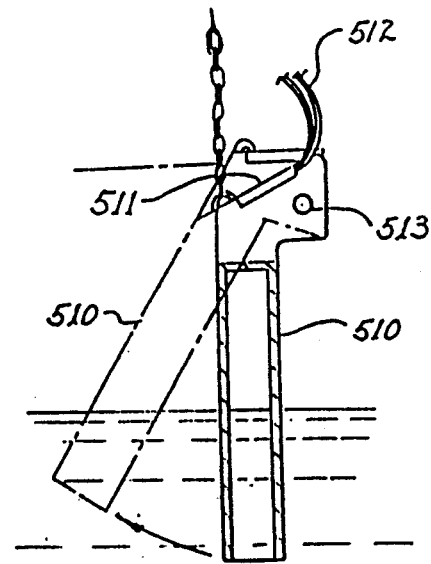
Fig. 12
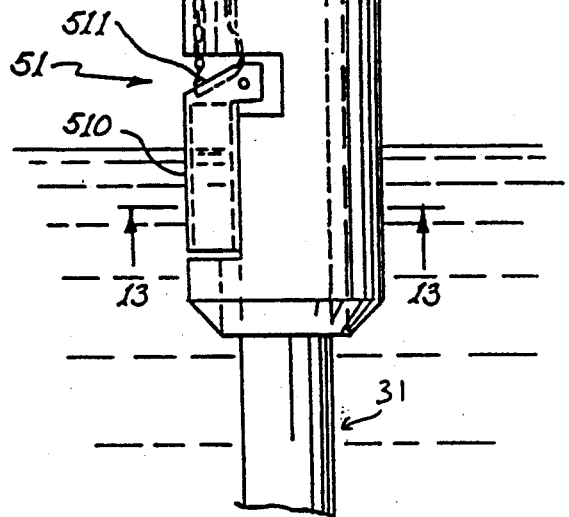
Fig. 11
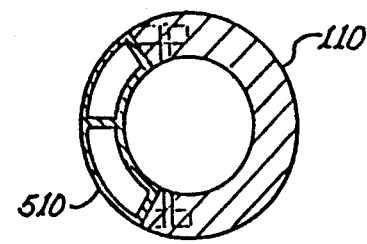
Fig. 13
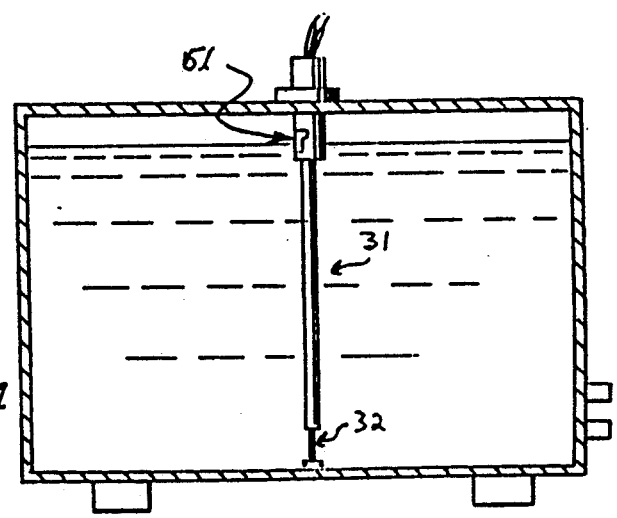
Fig. 14

MULTI-SENSOR PROBE ASSEMBLY AND METHOD FOR FUEL STORAGE SYSTEM INCLUDING OVERFLOW PROTECTION MEANS

FIELD OF THE INVENTION

This invention relates to instrumentation and measurement techniques and methods and, more particularly, to a probe and method including overflow protection means for monitoring various attributes of a fuel, such as aviation fuel, that is contained in a storage vessel or tank.

BACKGROUND OF THE INVENTION

As is widely recognized by those with experience in the subject matter of maintaining fuel storage systems, reliable and efficient maintenance and operation of fuel storage systems necessarily involves diligent attention to many parameters that are associated with the fuel that is maintained in storage. The need to monitor the condition of fuel in a storage tank is prevalent to an even greater degree with respect to aviation fuel storage systems for use in private, military or commercial aircraft.

Applicant here perceives that existing approaches to fuel storage maintenance and monitoring systems, while adequate for their contemplated purposes, fall short of realizing the objectives, advantages and capabilities of the invention described herein.

Specifically, what is required is an apparatus and associated method for conveniently and reliably monitoring predetermined parameters of fuel that is stored in a fuel storage system. Among the parameters to be monitored are the quantity of the fuel contained in the storage system, the purity of the fuel or the presence of contaminants in the fuel, and the temperature of the fuel. The apparatus and method to be used to perform these functions should be convenient to install, operate and maintain. The apparatus should be resistent to adverse aspects of the conditions in which it will be called upon to operate, and should be flexible for use with automated systems.

SUMMARY OF THE INVENTION

The above and other objects, advantages and capabilities are achieved in one aspect of the invention by a probe assembly that includes a plurality of sensors for respectively measuring predetermined attributes of a fluid. The probe assembly comprises a first sensor for measuring the quantity of the fluid. The first sensor includes a capacitive reference cell and a capacitive product measurement cell, each of said cells being characterized by respective associated capacitances. In particular, the capacitance associated with the product measurement cell varies in accordance with the quantity of the fluid so that the quantity of the fluid is indicated by the capacitance associated with the product cell while the dielectric of the fluid is determined by the capacitance associated with the reference cell. A second sensor extends coaxially at an extremity of the reference cell and includes a conductive portion to be at least partially immersed in the fluid so that the conductive portion of the second sensor is operable to effectively form a capacitive element with the fluid and with an extraneous conductive elements (which can either be the metal of the storage vessel (or container) or, in the case of an insulating container, ground). In this manner, the capacitance of the capacitive element is determined by the characteristics of the fluid. A third sensor in the form of a thermistor is disposed in the reference cell for determining the temperature of the fluid.

Another aspect of the invention includes an associated method that utilizes the probe assembly to monitor the quantity of a fluid in a vessel. The method comprises maintaining, within the vessel, the probe assembly in a position so that the probe assembly is at least partially immersed in the fluid. The probe assembly operates, via the reference cell, to determine a reference dielectric that is established by the electrical properties of the fluid and operates, via the product measurement cell, to determine the quantity of the fluid contained in the vessel by use of the measurement capacitance for the product measurement cell established by the electrical properties of the fluid. The fluid is caused to enter into and substantially fill a chamber in the reference cell and to enter into and fill a portion of a chamber in the product measurement cell, the extent to which the chamber in the product measurement cell is filled depends on the quantity of the fluid in the vessel. An electrical signal is applied to the reference cell to establish a reference value. Similarly, an electrical signal is applied to the product measurement cell to determine a product measurement value in order to determine the quantity of the fluid in the vessel.

In a further aspect of the invention, the probe assembly is utilized in a method of monitoring the fluid in order to determine the presence of a contaminant, such as water. The method comprises (a) maintaining within the vessel a conductive tank sensor member (i.e., the second sensor) at least partially immersed in the fluid; (b) maintaining the tank sensor member in position to form a capacitance with the fluid and with a second conductive member (i.e. a metal vessel or ground); (c) determining the magnitude of the capacitance so formed; and (d) comparing the magnitude determined in Step (c) with a previously determined magnitude associated with substantially uncontaminated fluid to determine the presence, or not, of a contaminant in the fluid.

BRIEF DESCRIPTION OF THE DRAWINGS

FIG. 3 provides a cross-sectional view of the subject probe assembly, illustrating in detail the separate sensors 31, 32, and 33 included therein.

FIG. 4 is a perspective view of the circuit board 41 that is mechanically connected to the probe assembly at housing coupler 42.

FIG. 5 is a diagrammatic representation of the manner in which the capacitance, Qy, associated with the reference cell 311 relates to the capacitance, Qx, associated with the product measurement cell 312. Although the length of the reference cell chamber is preferably much less (approximately 1/20) the length of the product cell chamber, a greater diameter of the first inner element usually results in substantially equal respective capacitances when the storage tank is empty.

FIG. 11 depicts the manner in which overflow apparatus, including float 510 and mercury switch 511, are supported on housing 100.

FIG. 12 is a cross-sectional view that illustrates the manner in which the overflow apparatus responds to a rising fuel level.

FIG. 13 is a cross-sectional view of the float 510 and housing 100, taken on line 13—13 of FIG. 11.

FIG. 14 is a cross-sectional view of a typical storage tank, illustrating the position of overflow apparatus 51 with respect to the probe assembly.

DESCRIPTION OF PREFERRED EMBODIMENT

Figure 1:
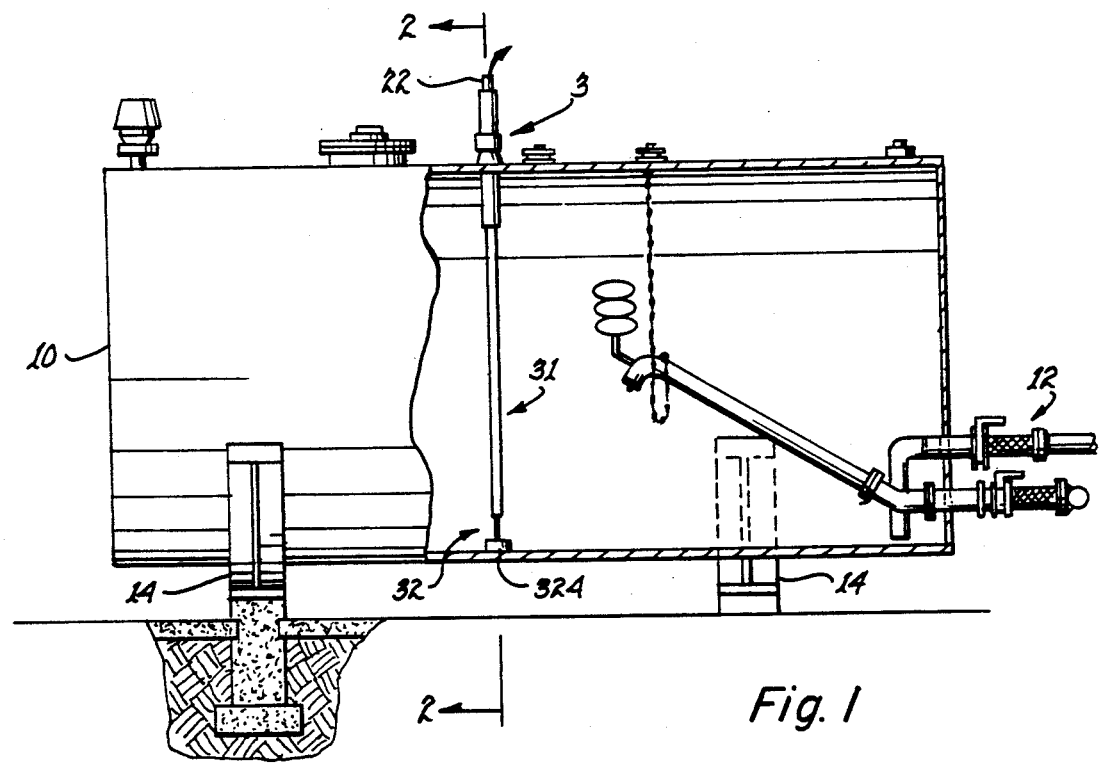
FIG. 1 is a side view of a fuel storage system with which the subject probe assembly may be used wherein, in partially exposed portions, the manner in which the probe assembly is disposed within the tank is illustrated.

For a better understanding of the subject invention, reference is made to the following description and appended claims, in conjunction with the above-described figures. Depicted in FIG. 1 is a side view, with a partially exposed cross-section, of a typically configured fuel tank 10 with which the subject probe assembly 3 may be advantageously used. Tank 10 is seen to include a float assembly that operates to control the flow of fuel to the tank through intake lines 12. As may be discerned from FIG. 1, the tank may be supported above-ground by support members 14. (Except to the extent specifically indicated below, the design construction of the tank, intake lines and support members are not considered by the inventor to constitute aspects of his invention, but are generally well known to those having ordinary skill in the art.)

As can be readily observed in FIG. 1, the probe assembly 3 extends generally linearly, in a vertical direction from the top of the tank to the bottom. At the top of the tank, a conduit 22 couples the probe assembly, more specifically, electrical signals developed by the probe assembly in response to predetermined attributes of the fuel contained in the tank, to a common controller 21 (see FIG. 2) that monitors those attributes.

Figure 2:
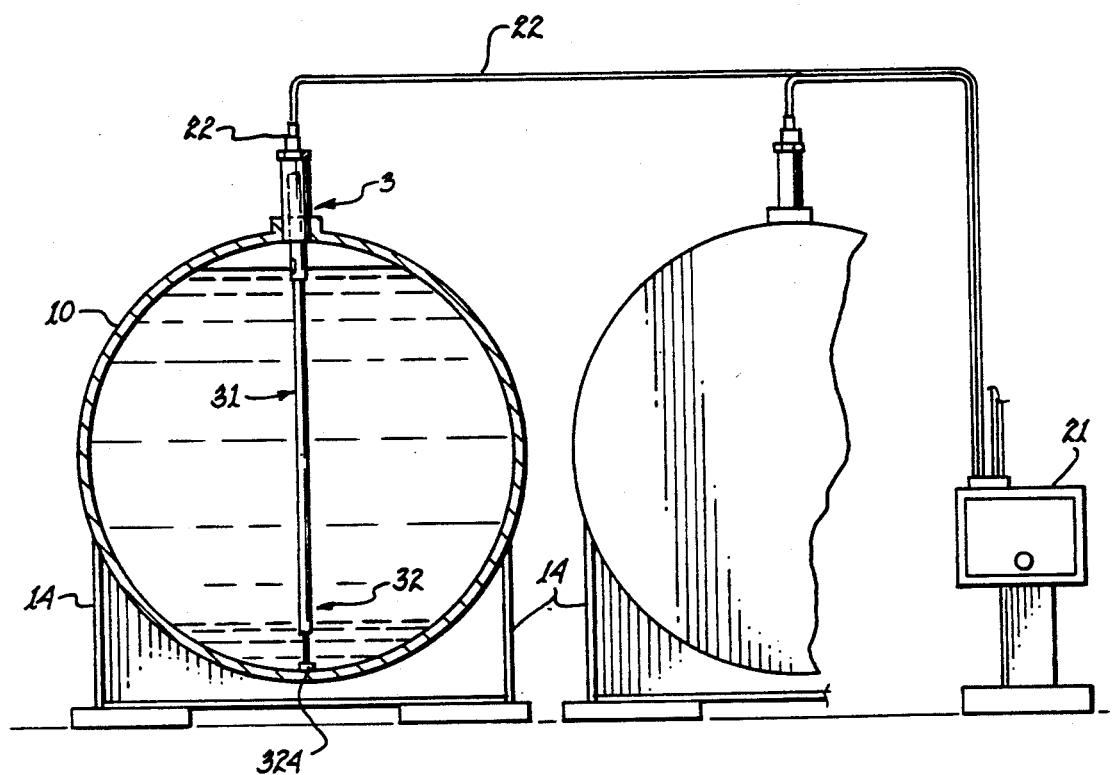
FIG. 2 is a cross-sectional view, taken on line 2—2 of FIG. 1, to illustrate that a typical storage system may contain a number of storage tanks and to also illustrate the manner in which signals from probe assemblies that operate in the respective storage tanks may be coupled to a common controller.

FIG. 2 is a view taken on line 2—2 of FIG. 1. From FIG. 2 it can be seen that a commonly encountered fuel storage installation may include several (on the order of 6 to 8) storage tanks. Each of the storage tanks is equipped with a dedicated probe assembly, and the respective probe assemblies are coupled in parallel through conduit 22 to a common controller 21. At this point, it is appropriate to redirect attention to FIG. 3, in which is provided a detailed cross-sectional view of the probe assembly 3. As heretofore revealed, probe assembly 3 includes a plurality of sensors, 31 (reference and fluid quantity sensor), 32, and 33, for respectively monitoring and for measuring predetermined attributes of the fuel stored in the tank(s). In a preferred embodiment, sensor 31 is used to measure both the dielectric of the fuel and the quantity of the fuel in the tank; sensor 32 is used to detect the presence of a contaminate, such as water, in the fuel; and sensor 33 is used to monitor the temperature of the fuel. It goes without saying that the ability of a single, multi-sensor probe assembly to satisfy these important requirements represents a significant advance in the art of automated fuel storage systems.

As can easily be seen in FIG. 3, the probe assembly assumes an elongated, generally cylindrical outline, and extends from the bottom of the tank at sensor 32, upwardly so that a portion of the probe protrudes from the uppermost surface of the tank.

In a preferred embodiment, sensor 31 includes a reference cell 311 and a product measurement cell 312. In a manner that will be described in detail, the reference cell 311 and the product measurement cell 312 are effectively configured to form cylindrical capacitors, with the intervening fuel operating as dielectric. In a manner described below, the respective capacitances associated with cell 311 and cell 312 are quantified and used to provide an indication of the amount of fuel in the tank.

The reference cell and the product measurement cell are constructed from a plurality of mutually concentric, elongated cylindrical elements, 31a, 31b, 31c, disposed about a common vertical axis. For the purposes of this description, it may be assumed that the vertical axis of elements 31a, 31b, and 31c coincides with a conductor group of wires 34 that extends generally linearly from the top toward the bottom of the probe assembly. The function of conductor group of wires 34 will be made clear below. Because, as indicated above, elements 31a, 31b and 31c are intended to effectively form elements of capacitors, those elements are fabricated from a conducting material, such as, preferably, stainless steel for shaft 323, but preferably aluminum is used for the other conductors because aluminum oxide can easily be formed as a dielectric coating thereon. For convenience and clarity, the remainder of this description will adopt a convention according to which element 31a will be referred to as the "first inner element," element 31b as the "second inner element," and element 31c as the "outer element".

The first inner element and the second inner element are maintained in electrical isolation by a reference cell bushing 351 and a retainer fitting 352. The first inner element and the second inner element are positioned at respective positions along the length of the common axis so as to be physically nonoverlapping. In addition, outer element 31c is maintained in electrical isolation from inner element 31a by base assembly 36 and from inner element 31b by retainer fitting 353 and by product measurement cell bushing 354. As is indicated in FIG. 3, the diameter of outer element 31c is greater than the diameter of second inner element 31b. Outer element 31c is positioned and extends along the length of the common axis of the probe assembly so as to surround at least portions of both the first inner element 31a and the second inner element 31b. In the preferred embodiment illustrated in FIG. 3, outer element 31c essentially completely surrounds elements 31a and 31b. Those having ordinary skill in the art will easily determine, if so inclined, the manner in which the arrangement of elements 31a, 31b, and 31c depicted in FIG. 3 may be modified to accommodate various specific requirements, without undesirable compromise of the salient functions and characteristics of the probe assembly.

When arranged and constructed as described above, the juxtaposition of first inner element 31a, second inner element 31b, and outer element 31c form a chamber 37 into which fuel, as it fills the storage tank, will be permitted to flow. For clarity and convenience of description, chamber 37 may be viewed as comprising a reference cell chamber 371 and a product measurement cell chamber 372. The reference cell chamber may be viewed as including the volume within sensor 31 subtended by the outer element 31c and by the first inner element 31a. The product measurement cell chamber is, accordingly, deemed to include the volume subtended by the outer element 31c and the second inner element 31b. In practice the length of the second inner element 31b is approximately 20 times greater than the length of first inner element 31a, and its diameter is somewhat less, so that the volume enclosed by the reference cell chamber is much less than the volume enclosed by the product measurement cell chamber.

In operation, because the reference cell, and, concomitantly, the reference cell chamber, are disposed toward the bottom of the fuel tank, as fuel enters the tank and its quantity within the tank increases, the reference cell chamber is caused to be filled with fuel before the product measurement cell chamber begins to fill. Under contemplated conditions, the reference cell chamber will be entirely filled with fuel, and the degree to which the product measurement cell chamber is filled will depend, of course, on the total quantity of fuel in the tank. Consequently, two separately identifiable and quantifiable capacitances will be established. To wit: a reference cell capacitance to determine the dielectric of the fluid will be established by (i) first inner element 31a, (ii) so much of outer element 31c as effectively surrounds element 31a, and (iii) the fluid in the reference cell chamber. As indicated above, the reference cell chamber will normally be filled with fluid. Correspondingly, a product measurement cell capacitance will be established by (i) the second inner element 31b, (ii) so much of the outer element 31c as effectively surrounds element 31b, (iii) and so much of the fuel, as determined by the total quantity of the fuel in the tank, as is present in the product measurement cell chamber.

In operation, the quantity of fuel in the tank may be determined by first quantifying the reference cell (capacitance) fluid dielectric and then the product measurement capacitance. Because the reference (capacitance) fluid dielectric is independent of the quantity of fuel in the tank (i.e., under normal circumstances it is assumed that there will be sufficient fuel to fill the reference cell chamber), the reference capacitance will reflect the electrical properties of the fuel and the ambient tank conditions, or probe parameters, that are fixed or that have nearly equal effect on the reference cell and the product cell measurement capacitances. Therefore, a comparison of the reference cell capacitance to the product measurement cell capacitance will provide an indication of the quantity of fuel in the tank.

Circuitry provided on a circuit board 41, shown in both FIG. 3 and in FIG. 4, is used to couple electrical signals and data between the common controller 21 and the probe assembly, including sensors 31, 32 and 33.

With respect to sensor 31 and the measurement at hand, the circuit board operates to couple current to, and monitor the voltage of, both first inner element 31a and second inner element 31b. Electrical connection is made between circuit board 41 and first inner element 31a through a wire 341 included in conductor 34. Wire 341 is electrically connected to an annular connector plate 39 that is maintained in physical contact with inner element 31a. Similarly, an electrical connection is made between circuit board 41 and second inner element 31b through a wire 342, also included in conductor 34. Wire 342 is attached to the conductive retainer fitting 353. Finally, outer element 31c, assumed to be at ground potential for measurements made by sensor 31, is maintained in low-resistance contact with the conductive housing coupler 42. The dielectric (or nonconducting), product measurement cell bushing 354 serves to electrically isolate second inner element 31b from outer element 31c. FIG. 4 depicts the electrically conductive flange member 43 used to physically and electrically connect circuit board 41 to housing coupler 42, and in turn, to outer element 31c.

In order to determine the capacitances associated respectively with the reference cell and with the product measurement cell, it is merely required to apply a known voltage through a resistance (or, alternatively, a known current) to each of the first inner element 31a and the second inner element 31b. The rate of change of the voltage between first inner element 31a and outer element 31c will correspond to the reference cell (capacitance) liquid dielectric. Similarly, the rate of change of the voltage between second inner element 31b and outer element 31c will correspond to the product measurement cell capacitance. The product measurement cell capacitance will, as indicated above, be determined by the quantity of the fuel in the tank. A comparison of the reference cell (capacitance) liquid dielectric, which represents a known volume of fuel, with the product measurement cell capacitance will accordingly be indicative of the quantity of fuel in the tank. Circuitry of circuit board 41 operates as interface between the sensors of probe assembly 3 and common controller 21.

In accordance with the subject of invention, it is recognized that the product measurement cell capacitance may be used to detect leakage of fuel from the tank, or any similar condition that causes the fuel level to fall below a minimum desireable level. This function is accomplished by noting the value of the product measurement cell capacitance which changes corresponding to the level of the fluid in the tank. An abnormal reference cell capacitance will result when the fuel properties in the tank are changed or deviate from the expected properties which would display a known capacitance value.

Figure 6:
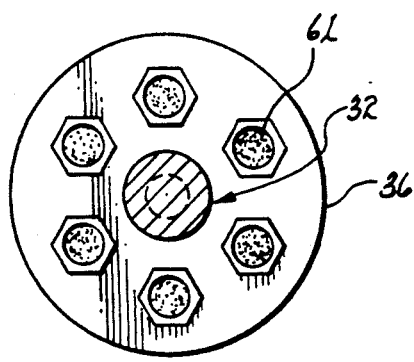
FIG. 6 is a cross-sectional view of the muffler 61 that serves to filter particles from the fuel before the fuel enters the reference cell chamber.
Figure 7:
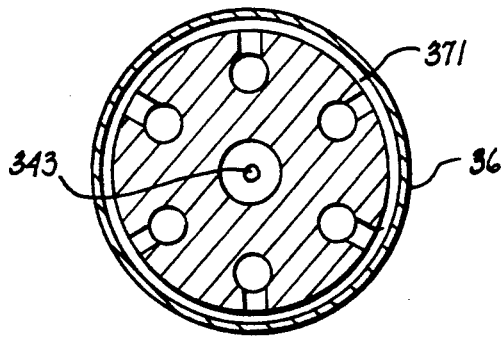
FIG. 7 depicts a cross-sectional view, taken on line 7—7 of FIG. 3, of the base member 36 in which muffler 61 is mounted.
Figure 8:
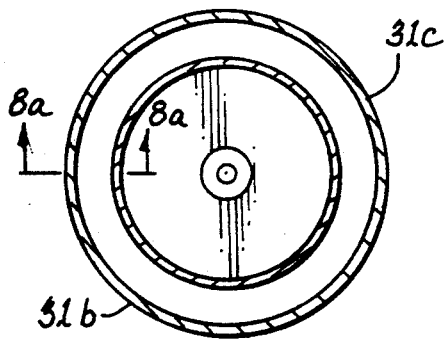
FIGS. 8 and 8a are a cross-sectional depiction of the concentric arrangement of outer element 31c and second inner element 31b.

A number of details remain to complete the description of sensor 31. As shown both in FIG. 3 and, in greater detail in FIG. 6, sensor 31 includes a plurality of mufflers or filters 61 that serve to filter particles of, for example, dirt that maybe contained in the fuel before it enters reference chamber 371. Each muffler or filter is preferably fabricated from brass and is generally annular in configuration. Equidisposed circumfrencially at an interior position of a base member 36 are a plurality (preferably six) of crushed particle filters or mufflers 61.

Figure 9:
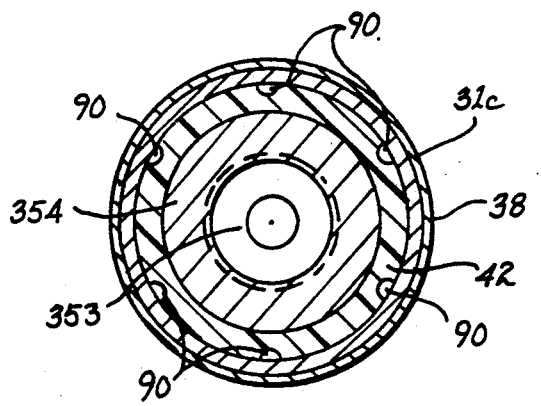
FIG. 9 is a cross-section taken on line 9—9 of FIG. 3 which depicts outer element 31c, grounding wedge 38, conductive housing coupler 42, nonconductive product measurement cell bushing 354, and retainer fitting 353.
Figure 8A:
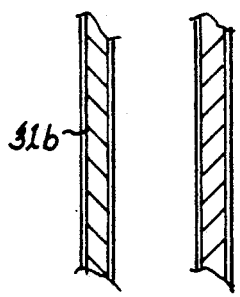

FIG. 9 permits a perception of a plurality of vents 91, disposed circumferencially in grounding wedge 38 so as to permit evacuation of air from chamber 372 as required.

Figure 10:
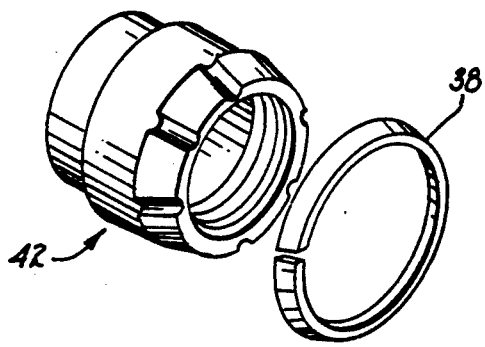
FIG. 10 is a perspective view of conductive housing coupler 42, including grounding wedge 38.

As can be seen in FIG. 10, housing coupler 42 includes a plurality of detented areas to accommodate venting of the product and reference cell chambers.

Returning attention to FIG. 3, illustrated therein is a second sensor 32, which will be referred to for clarity as the tank sensor. As indicated above, the tank sensor operates to detect the presence of contaminants, such as water, in the fuel. In accordance with FIG. 3, tank sensor 32 extends coaxially from the bottom end of sensor 31. Specifically, tank sensor 32 comprises a first threaded end 321 that is threaded into a complimentarily threaded inner surface of the base member 36 that is disposed at the intake end of the reference cell. Tank sensor 32 includes a conductive portion in the form of an elongated generally cylindrical steel shaft 323. In practice, the steel shaft is provided with a nonconductive coating, typically TEFLON. Disposed at an end of shaft 323, opposite end 321, is a second threaded end 322. Threaded onto second threaded end 322 is an insulating plastic sensor foot 324. A preferred material for sensor foot 324 is acetyl plastic.

Tank sensor 32 is designed to be at least partially immersed in the fluid. In fact it is intended that sensor foot 324 rest on the bottom of the tank so as to support the entire probe assembly. In this manner, the conductive portion of sensor 32, which includes at least teflon coated steel shaft 323, operates to form a capacitance that includes the fuel in the tank. An extraneous conductive element completes the tank sensor capacitance. If the tank is fabricated from steel, the tank itself constitutes the second ("extraneous") conductor required to complete the tank sensor capacitance. On those occasions when a nonconductive tank material is encountered, the tank wall material will become a second dielectric and the tank sensor capacitance will effectively be completed with earth as the requisite second conductive element. In either case (and in a manner similar to the theory of operation of sensor 31), the fuel resident in the tank will effectively constitute a dielectric in the tank sensor capacitance. Accordingly, the magnitude of the capacitance of the tank sensor capacitance will be determined by the properties of the fluid. Of particular import is that the properties of the fuel that determine its capacitance will be affected by the existence and level of contaminants in the fuel. Of course, one specific contaminant to be anticipated in any fuel storage vessel is water.

In a manner generally analogous to the manner in which the reference cell and the product measurement cell capacitances are determined, an electrical signal is applied from circuit board 41, through a wire 343 included in conductor 34. Wire 343 is electrically connected to end 321 of sensor 32. Specifically, a voltage pulse may be applied through a known resistance to the conductive portion 323 of sensor 32. The time constant of the rate of change of the voltage potential of conductor 323 may then be determined. From the time constant so determined, the magnitude of the tank sensor capacitance is established. If the tank sensor capacitance resulting from a contaminant-free fuel is known, then a case-by-case, or a continual, assessment of the contaminant content of the fuel may be acquired.

The probe assembly also includes a third sensor 33 in the form of a thermistor for determining the temperature of the fuel in the tank. As shown in FIG. 3, thermistor 33 is disposed within the reference cell, preferably, at a position approximately midway along the length of the reference cell. Thermistor 33 is coupled to circuit board 41 through conductor group of wires 34. Temperature data that can be derived from thermistor 33 is coupled to circuitry on circuit board 41. As with data derived from sensors 31 and 32, the circuit board 41 operates as an interface to common controller 21. Conductor 342 provides electrical connection to conductive annular member 353.

In addition to the functions described above, the probe assembly also combines an integral mechanism for anticipating and preventing an overflow condition in the fuel tank. Apparatus for providing this function is depicted in FIGS. 11 through 14, and is seen to include an overflow apparatus 51. In particular, overflow apparatus 51 is seen in FIGS. 11 and 12 to be held in hinged support on the exterior portion of housing 110 see FIG. 13.

Overflow apparatus 51 includes a buoyant float 510 that operates in the fashion of a conventional ballcock. As the fuel level in the tank rises, float 510 rotates, for example, in a clockwise fashion about a pivot point, thereby activating a, for example, mercury switch 511. A pair of wires 512 are connected to the mercury switch and carry a signal that indicates an imminent overflow condition. Those with ordinary skill in the art will readily recognize that the signal carried by wires 512 can be utilized in numerous ways to prevent fuel overflow. For example, the fuel pump that supplies fuel to the tank may be shut down, or the intake valve to the tank may be closed. In addition, or alternatively, an audible or visual alarm may be activated. A detailed understanding of the construction of float 510 may be gained from FIG. 13, which comprises a cross-sectional view taken at image plane 13—13. FIG. 14 depicts the manner in which overflow apparatus 51 is deployed in the fuel tank.

Accordingly, although there has been described above what at present is considered to be a preferred embodiment of an inventive probe assembly for use with an automated fuel storage system, it will be obvious to those with skill in the art that various changes and modifications may be made therein without departure from the scope of the invention as contemplated by the inventor and as defined by the appended claims. Based on the above description, those with ordinary skill in the art will recognize that the essence of the subject invention is a multi-sensor probe assembly so constructed as to form capacitances, and measure the fuel's dielectric, the magnitudes of which are determined by parameters associated with the fuel itself. The capacitances and dielectrics so established are used to determine both the quantity of fuel in the tank, as well as the presence of contaminants in the fuel and these functions are combined with an integral built-in mechanical safety overflow prevention device.

With the advantage of this teaching it is clear that functionally equivalent probe assemblies may be designed, without departure from the scope of this invention, to exhibit mechanically distinguishable embodiments.

I claim:

1. A probe assembly including a plurality of sensors for respectively measuring predetermined attributes of a fluid located in a container, the probe assembly comprising:

first sensor means for determining the dielectric constant of the fluid; second sensor means spaced from said first sensor means for providing an indication of the level of the fluid in the container using the knowledge of the dielectric constant of the fluid; and mechanical liquid level overflow cutoff device means spaced from both said first and second sensor means and located within said container near a top portion thereof for generating an electrical signal to indicate an overflow condition of said fluid within said container.

2. A probe assembly as defined in claim 1 wherein said first sensor means including a capacitive reference cell; said second sensor means including a capacitive product measurement cell, the capacitance associated with the product measurement cell varying in accordance with the quantity of the fluid so that the quantity of the fluid is indicated by the quantitive relationship between (i) the magnitude of the capacitance associated with the reference cell and (ii) the magnitude of the capacitance associated with the product measurement cell.

3. A probe assembly as defined in claim 2 wherein the first and second sensor means together comprising a plurality of mutually concentric, elongated cylindrical elements disposed about a common axis, wherein the plurality of cylindrical elements include a first inner element and a second inner element, the first and the second inner elements maintained in electrical isolation and positioned at respective positions along the length of the common axis so that the first inner element and the second inner element are physically nonoverlapping, and the plurality of cylindrical elements includes an outer element maintained in electrical isolation from the first inner element and from the second inner element, the outer element having a diameter greater than the diameters of both the first inner element and the second inner element and positioned along the length of the common axis so as to surround at least portions of both the first inner element and the second inner element.

4. A probe assembly as defined in claim 3 wherein the first inner element, the second inner element and the outer element are juxtapositioned to form a chamber into which is permitted to flow fluid to be measured, so that, as the quantity of fluid increases, portions of the chamber defined by the first inner element and by the outer element are caused to fill with the fluid before portions of the chamber that are defined by the outer element and the second inner element.

5. A probe assembly as defined in claim 4 wherein the reference cell includes the first inner element, a portion of the outer element as surrounds the first inner element, and a portion of the fluid as fills the portion of the chamber defined by the outer element and the first inner element and wherein the product measurement cell includes the second inner element, the portion of the outer element as surrounds the second inner element, and the portion of the fluid as fills the portion of the chamber defined by the outer element and the second inner element.

6. A probe assembly as defined in claim 5 further comprising a circuit board mechanically coupled to and maintained in proximity with the outer element, said circuit board electrically coupled through a plurality of conductive elements to both the first inner element and the second inner element for coupling currents to the first and to the second inner elements and for monitoring a voltage between the first inner element and the outer element and for monitoring a voltage between the second inner element and the outer element.

7. A probe assembly as defined in claim 6 wherein the circuit board is coupled to the outer element through a housing coupler and a grounding wedge.

8. A probe assembly as defined in claim 2, wherein said second sensor means extending coaxially at an extremity of the reference cell and including a conductive portion to be at least partially immersed in the fluid so that the conductive portion of said second sensor means is operable to effectively form a capacitive element with the fluid and with an extraneous conductive element, whereby the capacitance of the capacitive element is determined by characteristics of the fluid.

9. A probe assembly as defined in claim 8 wherein the capacitance of the capacitive element is determined by the water content of the fluid.

10. A probe assembly as defined in claim 9 wherein the second sensor means is constructed in the form of a generally cylindrical steel shaft coated with an insulating material.

11. A probe assembly as defined in claim 10 wherein the second sensor means exhibits a threaded portion disposed at an end of the cylindrical steel shaft.

12. A probe assembly as defined in claim 11 wherein the second sensor means includes a threaded insulating sensor foot threaded onto the threaded portion of the second sensor means.

13. A probe assembly as defined in claim 12 further comprising a circuit board mechanically coupled to and maintained in proximity with the product measurement cell.

14. A probe assembly as defined in claim 13 wherein the second sensor means is coupled to the circuit board through a conductive element for carrying current to the second sensor means so that the capacitance of the capacitive element may be determined.

15. A probe assembly as defined in claim 14 wherein the conductive portion of the second sensor means is arranged to form a capacitance with the fluid and with a conductive vessel in which the fluid is contained.

16. A probe assembly as defined in claim 8 further comprising:
    third sensor means in the form of a thermistor disposed in the reference cell for determining the temperature of the fluid.

17. A probe assembly as defined in claim 16 further comprising a circuit board mechanically coupled to and maintained in proximity with the product measurement cell.

18. A probe assembly as defined in claim 17 wherein the third sensor means is coupled to the circuit board through a conductive element for conducting an electrical signal that is associated with the thermistor and that is indicative of the temperature of the fluid.

19. A probe assembly for determining a plurality of attributes associated with a fluid contained in a vessel, the probe assembly comprising:
    reference cell means for determining a reference dielectric from a capacitance established by properties of the fluid in the vessel, product measurement cell means for determining a measurement capacitance established by the volume of the fluid contained in the vessel, so that the volume of fluid contained in the vessel may be determined by the quantitive relationship of the reference dielectric to the measurement capacitance; and liquid level overflow cutoff device means spaced from both said reference cell means and said product measurement cell means and located within said vessel near a top portion thereof for generating an electrical signal to indicate an overflow condition of said fluid within said vessel.

20. A probe assembly for determining a plurality of attributes associated with a fluid contained in a vessel as defined in claim 19 wherein the reference cell means comprises a generally cylindrical first inner element, the product measurement cell means comprises a generally cylindrical second inner element, and the reference cell means and the product measurement cell means mutually comprise an elongated, generally cylindrical outer element that is positioned substantially concentrically with respect to, and largely surrounds, the first inner element and the second inner element.

21. A probe assembly for determining a plurality of attributes associated with a fluid contained in a vessel as defined in claim 20 wherein the first inner element, the second inner element and the outer element are mutually so arranged that (i) the first inner element and the outer element form a reference chamber, (ii) the second inner element and the outer element form a product measurement chamber, and (iii) as the quantity of fluid in the vessel increases, the fluid first enters and substantially fills the reference chamber before entering the product measurement chamber, whereby (a) the reference dielectric is established by the first inner element, the outer element, and the quantity of fluid in the reference chamber, and (b) the measurement capacitance is established by the second inner element, the outer element, and the quantity of the fluid in the product measurement chamber.

22. A probe assembly for determining a plurality of attributes associated with a fluid contained in a vessel as defined in claim 19 further comprising tank sensor means disposed at an extremity of the reference cell for at least one of monitoring a predetermined attribute of the fluid and identifying the material of the vessel.

23. A probe assembly for determining a plurality of attributes associated with a fluid contained in a vessel as defined in claim 22 wherein the tank sensor means constitutes an element of a tank sensor capacitive member operable to at least one of monitor the predetermined attribute of the fluid and identifying the material of the vessel.

24. A probe assembly for determining a plurality of attributes associated with a fluid contained in a vessel as defined in claim 23 wherein the tank sensor means includes a conductive portion for immersion into the fluid so that the conductive portion of the tank sensor means, the fluid, and an extraneous conductive member are cooperatively arranged to form the tank sensor capacitive member.

25. A probe assembly for determining a plurality of attributes associated with a fluid contained in a vessel as defined in claim 24 wherein the extraneous conductive member constitutes at least a part of the vessel.

26. A probe assembly for determining a plurality of attributes associated with a fluid contained in a vessel as defined in claim 24 wherein the tank sensor means consists essentially of a cylindrical steel shaft and wherein the cylindrical steel shaft is coated with an insulating material.

27. A probe assembly for determining a plurality of attributes associated with a fluid contained in a vessel as defined in claim 26 wherein the tank sensor means exhibits a threaded portion disposed at an end of the cylindrical steel shaft and wherein the tank sensor means comprises a threaded insulating sensor foot threaded onto the threaded portion.

28. A probe assembly for determining a plurality of attributes associated with a fluid contained in a vessel as defined in claim 24 wherein the reference cell means comprises a generally cylindrical first inner element, the product measurement cell means comprises a generally cylindrical second inner element, and the reference cell means and the product measurement cell means mutually comprise an elongated, generally cylindrical outer element that is positioned substantially concentrically with respect to, and largely surrounds, the first inner element and the second inner element.

29. A probe assembly for determining a plurality of attributes associated with a fluid contained in a vessel as defined in claim 28 further comprising a circuit board mechanically coupled to and maintained in proximity with the outer element, said circuit board electrically coupled through a plurality of conductive elements to both the first inner element and the second inner element for coupling currents to the first and to the second inner elements and for monitoring a voltage between the first inner element and the outer element and for monitoring a voltage between the second inner element and the outer element.

30. A probe assembly for determining a plurality of attributes associated with a fluid contained in a vessel as defined in claim 29 wherein the circuit board is coupled to the outer element through a bushing and a grounding wedge.

31. A probe assembly for determining a plurality of attributes associated with a fluid contained in a vessel as defined in claim 29 and further comprising thermistor means disposed in the reference cell for determining the temperature of the fluid.

32. A probe assembly for determining a plurality of attributes associated with a fluid contained in a vessel as defined in claim 31 wherein said thermistor means is coupled to the circuit board through a conductive element for conducting a current that is associated with the thermistor means and that is indicative of the temperature of the fluid.

33. A probe assembly for determining a plurality of attributes associated with a fluid contained in a vessel as defined in claim 29 wherein the first inner element, the second inner element and the outer element are mutually so arranged that (i) the first inner element and the outer element form a reference chamber, (ii) the second inner element and the outer element form a product measurement chamber, and (iii) as the quantity of fluid in the vessel increases, the fluid first enters and substantially fills the reference chamber before entering the product measurement chamber, whereby (a) the reference dielectric is established by the first inner element, the outer element, and the quantity of fluid in the reference chamber, and (b) the measurement capacitance is established by the second inner element, the outer element, and the quantity of the fluid in the product measurement chamber.

34. A probe assembly for determining a plurality of attributes associated with a fluid contained in a vessel as defined in claim 33 further comprising a base member disposed along the length of the probe assembly at a position proximal the reference cell that causes the base member to traverse the flow of fluid into the reference chamber.

35. A probe assembly for determining a plurality of attributes associated with a fluid contained in a vessel as defined in claim 34 wherein the base member is generally annular in form and comprises a plurality of circumferencially disposed filters for removing particulates from the fluid before the fluid enters the reference chamber.

36. A probe assembly for determining a plurality of attributes associated with a fluid contained in a vessel as defined in claim 35 wherein each of the plurality of filters comprise brass and crushed particles.

37. A method of monitoring the quantity of a fluid contained in a vessel, the method comprising the steps of:
  (a) maintaining within the vessel a probe assembly that is at least partially immersed in the fluid, which probe assembly comprises (i) a reference cell for determining a reference dielectric that is established by capacitance properties of the fluid and (ii) a product measurement cell for determining a measurement capacitance established by the capacitance properties of the fluid and the quantity of the fluid contained in the vessel;
  (b) causing the fluid to enter and substantially fill a chamber in the reference cell and to enter and fill a portion of a chamber in the product measurement cell, which portion depends on the quantity of the fluid in the vessel;
  (c) applying an electrical signal to the reference cell to establish a reference value;
  (d) applying an electrical signal to the product measurement cell to determine a product measurement value;
  (e) comparing the reference value to the product measurement value in order to determine the quantity of the fluid in the vessel; and
  (f) generating an electrical signal from a liquid level overflow cutoff device spaced from the reference cell and the product measurement cell and located within the vessel near a top portion thereof to indicate an overflow condition of the fluid within the vessel.

38. A method of monitoring the quantity of a fluid contained in a vessel as defined in claim 37 wherein an electrical signal is applied to the reference cell so as to determine a reference capacitance and to the product measurement cell so as to determine a product measurement capacitance and wherein the product measurement capacitance is compared to the reference capacitance in order to determine the quantity of the fluid in the vessel.

39. A method of monitoring the quantity of a fluid contained in a vessel as defined in claim 38 wherein the reference capacitance is determined by observing the time constant of a change of a voltage associated with the reference cell and the product measurement capacitance is determined by observing the time constant of a change of a voltage associated with the product measurement cell.

40. A method of monitoring the quantity of a fluid contained in a vessel as defined in claim 39 wherein the fluid is filtered before it is caused to enter the reference cell.

41. A probe assembly for monitoring fuel contained in a storage vessel, the probe assembly comprising:
  reference cell means for determining a reference dielectric established by a capacitance of the fluid in the vessel; product measurement cell means for determining a measurement capacitance established by the volume of the fluid contained in the vessel, so that the volume of the fluid contained in the vessel may be determined by the quantitive relationship of the reference dielectric to the measurement capacitance;
  interface circuit means for providing signals to the reference cell means and to the product measurement cell means and for coupling data from the reference cell means and from the product measurement cell means to a common controller; and
  liquid level overflow cutoff device means spaced from said reference cell means and said product measurement cell means and located within and near a top portion of said vessel for generating an electrical signal to indicate an overflow condition of said fluid within said vessel.

42. A probe assembly as defined in claim 41 further comprising;
  a tank sensor extending coaxially at an extremity of the reference cell means and including a conductive portion to be at least partially immersed in the fuel so that the conductive portion of said tank sensor is operable to effectively form a capacitive element with the fluid and with an extraneous conductive element, whereby the capacitance of the capacitive element is determined by contaminants in the fuel.

43. A probe assembly as defined in claim 42 wherein the reference cell means, the product measurement cell means, and the tank sensor are coupled to the interface circuit means by a conductor.

44. A probe assembly as defined in claim 43 wherein the liquid level overflow cutoff device means comprises switch means coupled to a buoyant float for generating an alarm or control signal when the fuel in the vessel exceeds a predetermined level.

45. A probe assembly as defined in claim 44 wherein the alarm signal is used to either cause an audible alarm or provide an electrical control signal.

* * * * *